United States Patent

Brown et al.

[11] Patent Number: 5,223,141
[45] Date of Patent: Jun. 29, 1993

[54] METHOD FOR REMOVING AND RECOVERING PAINT OVERSPRAY IN A WATER WASH SPRAY BOOTH

[75] Inventors: William B. Brown, Birmingham; Edmund L. Tisko, Royal Oak; Harry R. Charles, Mt. Clemens; Dean L. Miles, Rochester Hills, all of Mich.

[73] Assignee: Chemfil Corporation, Troy, Mich.

[21] Appl. No.: 918,744

[22] Filed: Jul. 27, 1992

[51] Int. Cl.⁵ .......................... B01D 11/04
[52] U.S. Cl. ...................... 210/634; 210/789; 210/511
[58] Field of Search .......... 210/634, 289, 511; 55/45, 85

[56] References Cited

U.S. PATENT DOCUMENTS

| | | |
|---|---|---|
| 4,854,947 | 8/1989 | Patzelt ........................ 55/85 |
| 4,919,691 | 4/1990 | Patzelt et al. ................ 55/45 |
| 5,019,138 | 5/1991 | Farrah et al. ................ 55/89 |
| 5,098,450 | 3/1992 | Patzelt et al. ............... 55/45 |

Primary Examiner—Frank Spear
Attorney, Agent, or Firm—William J. Uhl

[57] ABSTRACT

A method for the removal and recovery of paint overspray in a water wash spray booth is disclosed. The method uses a circulating agitated dispersion of an organic solvent component in water which collects the paint overspray. The dispersion containing the overspray is permitted to phase separate into an organic phase and an aqueous phase. The organic phase is further treated such as by distillation to separate the paint solids from an organic solvent portion which contains the original organic solvent component and the organic solvents associated with the paint. The organic solvent portion can be recycled and reused in the circulating dispersion and the paint solids can be recovered for further use such as a filler for adhesives or can be disposed of.

15 Claims, 1 Drawing Sheet

METHOD FOR REMOVING AND RECOVERING PAINT OVERSPRAY IN A WATER WASH SPRAY BOOTH

FIELD OF THE INVENTION

The present invention relates to a paint overspray removal process and more particularly to a process which enables recovery and reuse of the components of the paint overspray.

BACKGROUND OF THE INVENTION

Automatic spraying techniques have long been employed for painting large articles such as cars, trucks, refrigerators, etc. The items being sprayed are generally advanced along a conveyor line which passes through a water wash paint spray booth where a fine spray of paint is directed at the articles being painted from spray guns which are located at the sides of the conveyor. Overspray paint, that is, paint which does not contact the article being painted, forms a fine mist of paint in the air space surrounding the painted article. This paint mist must be removed from the air. To accomplish this, the contaminated air is pulled through the paint spray booth by air exhaust fans. A curtain of circulating water is maintained across the path of the air in such a manner such that the air must pass through the water curtain to reach the exhaust fans. As the air passes through the water curtain, the paint mist is "scrubbed" from the air and carried to a sump basin usually located below the paint spray booth. In this area, the paint particles are separated from the water so that the water may be recycled and the paint particles disposed of.

One of the difficulties with recovering paint overspray in a water wash spray booth as described above is the limited amount of paint which can be incorporated into the water. Paint is a tacky material and it tends to flocculate and adhere to the spray booth surfaces, particularly in the sump and drain areas and must constantly be removed from the sump to prevent clogging of the sump drain and recirculating system. This is generally accomplished by shoveling which is costly and time consuming. Although it is known in the art to add detackifiers to the circulating water system to detackify the paint so that it will not adhere to the surfaces of the spray booth and be easier to remove from the system, the paint content in the circulating water system must still be kept relatively low to prevent paint flocculation. Typically, the circulating water systems with conventional detackifiers contain from about 1 to 5 percent by weight paint overspray based on total weight of the circulating water.

It is known in the art, for example, in U.S. Pat. No. 4,854,947 and U.S. Pat. No. 4,919,691, to use oil-in-water emulsions in the circulating water to scrub and to detackify the paint overspray. By using these oil-in-water emulsions, a higher percentage of paint overspray can be incorporated into the circulating water without the paint overspray deflocculating and clogging the sump drain and sewer system. The processes described in the prior art require a continuous monitoring of the pH of the bath to insure for stability of the emulsion and then chemical manipulation of the emulsion to break the emulsion and recover the various components of the paint overspray.

It is also known in the art in U.S. Pat. No. 5,019,138 to use an organic solvent, i.e., N-methyl pyrrolidone, to scrub the paint overspray from the surrounding air. However, the use of high quantities of organic solvent needed for this process is expensive and a potential health hazard.

SUMMARY OF THE INVENTION

In accordance with the present invention, a method for the removal and recovery of paint overspray in a paint spray booth is provided. The method provides first contacting the paint overspray, which contains an organic solvent portion and a portion which contains paint solids, namely pigments and organic resins, with an agitated dispersion of an organic solvent component in water so as to collect the paint overspray in the agitated dispersion. Agitation can be accomplished by pumping and circulating the dispersion in a water wash spray booth.

The organic solvent component which contains an organic solvent or mixture of organic solvents has a solubility in water of less than 15 percent by weight and water is soluble in the organic solvent component to an extent of less than 15 percent by weight. The percentages by weight are based on weight of organic solvent component and water. The organic solvent component is further characterized as having a specific gravity less than 0.98 or greater than 1.02.

The dispersion is stable in the presence of agitation which occurs as the dispersion is being pumped and circulated through the spray booth but is unstable in the absence of agitation such as a holding area described in more detail below associated with the circulating system of the spray booth. Upon passing to this quiescent area, the dispersion spontaneously phase separates into an organic phase and an aqueous phase. The organic phase and at least a portion of the paint overspray is separated from the aqueous phase such as by skimming or pumping depending on the specific gravity of the organic solvent component. The organic phase is further separated typically by distillation into an organic solvent portion (which contains the organic solvent component and at least a portion of the organic solvent associated with the paint overspray) and a portion which contains paint solids. The recovered organic solvent portion can be recycled and dispersed in water for subsequent contact with the paint overspray. The portion which contains the paint solids is recovered and reused if possible such as a fuel supplement or as a filler for adhesives, sealants or coatings or disposed of.

The process of the invention enables removal of paint overspray at relatively high concentrations in the circulating dispersion and also provides for recycle and reuse of the components of the paint overspray.

DETAILED DESCRIPTION

Figure 1:
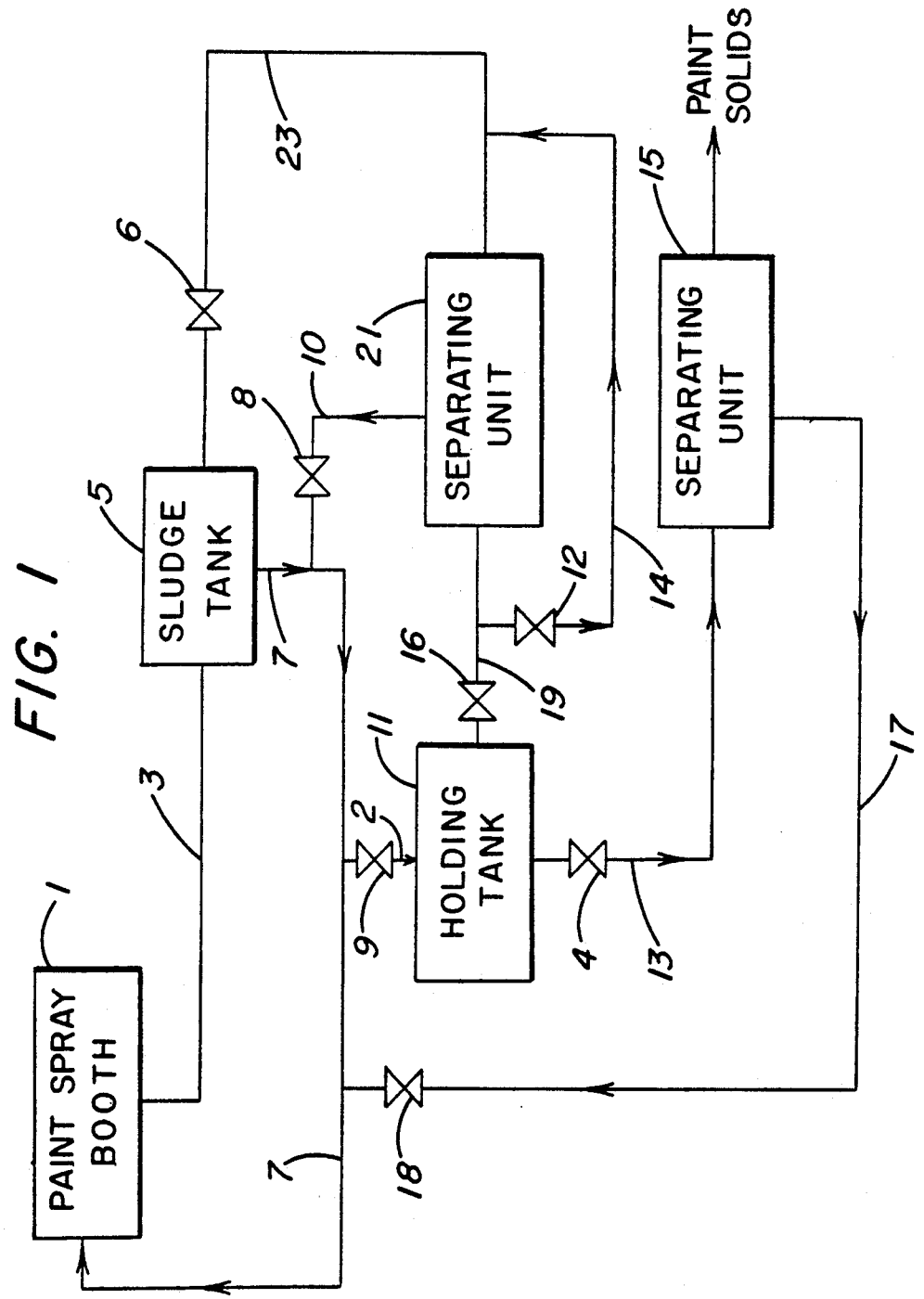
FIG. 1 is a Block Diagram showing the Method of the Invention.

The organic solvent component which is used in the method of the invention has a solubility in water of less than 15 percent, preferably from 1 to 5 percent by weight, and in which the water is soluble to an extent of less than 15 percent, preferably from 1 to 5 percent by weight; the percentages by weight being based on total weight of water and organic solvent. Organic solvent components having solubilities in water greater than 15 percent by weight are undesirable because the affinity with the water phase would not allow efficient and rapid separation of the two phases, and organic solvent components in which water is soluble to an extent greater than 15 percent by weight are undesirable because solubility of the organic resin of the paint overspray in the organic solvent component would be reduced.

Besides the solubility characteristics described above, and organic solvent component should have a specific gravity sufficiently higher or lower than water to facilitate separation of the organic phase from the aqueous phase. Typically, the specific gravity of the organic solvent component is either less than 0.98 of greater than 1.02, preferably from 0.90 to 0.95 or 1.05 to 1.10. Specific gravities within the range of 0.98 to 1.02 should not be used because the dispersion will be too stable and will not readily spontaneously phase separate into an organic phase and an aqueous phase. Organic solvent components with specific gravities less than 0.90 or greater than 1.10 are not preferred because the dispersions are too unstable requiring significant in line agitation to keep the organic solvent component in dispersion.

In addition to the solubility and specific gravity properties, the organic solvent component preferably will have a vapor pressure less than 0.1 millimeters of mercury. Low vapor pressures are desirable because less volatile organic content is released to the atmosphere.

The organic solvent component can comprise a single organic solvents or a mixture of organic solvents. Examples of organic solvents which are usable in the method of the invention are alkyl ester of polycarboxylic acids or mixtures of such esters. Typically, these esters are of the following structural formula:

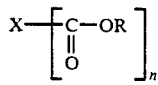

where X is a linear or branched aliphatic group having 2 to 12 carbon atoms or aromatic group having 6 to 20 carbon atoms and R is a linear or branched alkyl group typically containing from about 1 to 8 carbon atoms and $n=2$ to 4. Substituted aliphatic, aromatic and alkyl groups can be used in which the substitutents do not adversely affect the removal and the recovery of the paint overspray components. Preferably, the alkyl esters are dialkyl esters of dibasic carboxylic acids or mixtures of such esters. These esters have the following structural formula:

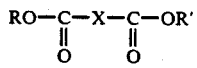

where X is a linear or branched alkylene group containing from 2 to 12, preferably 2 to 8 carbon atoms and R and R' can be the same or different and are linear or branched alkyl containing from 1 to 6, preferably from 1 to 4 carbon atoms. Examples of specific alkyl esters of polybasic acids include dimethyl adipate, dimethyl glutarate, dimethyl succinate and mixtures thereof; diisobutyl adipate, diisobutyl glutarate, diisobutyl succinate and mixtures thereof. Mixtures of such esters are available from E. I. Du Pont de Nemours and Company as Dibasic Acid Ester (DBE-3) or Dibasic Acid Diisobutyl Ester (DBE-IB).

Examples of other organic solvents include polyol ethers including mono and diethers of glycols such as mono or dialkyl or mono or diaryl or mixed alkyl and aryl ethers of glycols such as ethylene glycol, diethylene glycol, dipropylene glycol and propanol and mixtures of glycol ethers. Examples of specific polyol ethers include ethylene glycol monobutyl ether, ethylene glycol monophenyl ether, diethylene glycol monobutyl ether, propylene glycol monomethyl ether, propylene glycol monophenyl ether, dipropylene glycol monomethyl ether, dimethylether of ethylene glycol and dimethylether of diethylene glycol.

Examples of other organic solvents include furfural and isophorone.

The following Table lists the properties of various solvents useful in the practice of the invention.

TABLE

| Solvent | Specific Gravity | Weight Percent Solubility of Solvent in Water | Weight Percent Solubility of Water in Solvent | Vapor Pressure (mm Hg at 20° C.) |
|---|---|---|---|---|
| DBE-3 | 1.068 | 2.5 | 2.5 | 0.06 |
| Ethylene glycol monophenyl ether | 1.104 | 2.3 | 2.3 | 0.007 |
| Propylene glycol monophenyl ether | 1.063 | 1.1 | 1.1 | <0.01 |
| Furfural | 1.160 | 8.3 | 4.8 | 1.7 |
| Isophorone | 0.923 | 1.2 | 4.3 | 0.2 |
| DBE-IB | 0.970 | — | — | <0.1 |

The concentration of the organic solvent component in the aqueous dispersion is typically from 2 to 50, preferably from 15 to 25 percent by weight based on weight of organic solvent component and water. Concentrations less than 2 percent by weight are undesirable because the mechanism of pumping would not allow proper dispersion of the organic solvent component, whereas concentrations greater than 50 percent by weight are undesirable because of cost and unnecessarily high volumes for further processing.

The organic solvent component can be dispersed into the water by simply adding it to the circulating water in a typical water wash spray booth. The pumping and circulation action associated with the spray booth insures that the organic solvent component will be stably dispersed in the aqueous medium.

The paint overspray typically contains pigments, organic resins and organic solvent associated with industrial paints. Typical paints are acrylic-based paints, urethane-based paints, base coat/clear coat paints and high solids paints which are used in the automotive, appliance and general industrial markets.

Referring to FIG. 1 which is a block diagram showing the overall method of the invention, a paint spray booth 1 which contains a circulating aqueous dispersion of an organic solvent component as described above is provided. The circulating dispersion forms a continuous moving curtain which scrubs an air flow containing paint overspray so as to collect the paint overspray in the dispersion. Paint spray booths containing continuous curtains of water to scrub air flows containing paint overspray are known in the art and will not be further described here. Reference is made, however, to U.S. Pat. No 4,980,030 which discloses typical paint spray booths.

The dispersion which contains the paint overspray is pumped through conduit or line 3 to a sludge tank 5 from where paint overspray can optionally be removed. The dispersion is returned through line 7 to the paint spray booth 1 to disperse additional paint overspray. The continuous circulation and pumping action keeps the dispersion agitated and stable. A portion of the dispersion containing the paint overspray passes to through valve 9 and line 2 to a holding tank 11 which is an area relatively free of agitation. While in the holding tank, the dispersion spontaneously phase separates into an organic phase and an aqueous phase. The organic phase which contains most if not all of the paint overspray is separated from the aqueous phase by skimming of pumping through valve 4 and line 13 to the separating unit 15 where the organic phase is further separated into an organic solvent portion and a portion which contains paint solids which comprise pigment and organic resin. Typical separating units would be a distillation column, a thin film evaporator or a centrifuge. The organic solvent portion (which contains the organic solvent component initially used to formulate the dispersion as well as at least a portion of the organic solvent component associated with the paint) is recovered in either the distillate or centrifugate and returned through line 17 and valve 18 to line 7 where the organic solvent portion is dispersed with the dispersion being circulated through line 7. Since the dispersion circulating through line 7 is in an agitated state, the organic solvent portion passing through line 17 is readily dispersed. The paint solids contained in the residue of the separating unit 15 are reclaimed for further use or are disposed of. Since the paint is uncured, it can be used as a curable filler in adhesives or in paints.

Because of the limited solubility of the organic solvent component in water, the aqueous phase contains small amounts of organic solvent including small concentrations of organic solvent associated with the paint which can be removed from the aqueous phase by passing the aqueous phase from the holding tank through valve 16 and line 19 to a separating unit 21. The organic solvent or mixture of solvents, as the case may be, can be removed by distillation, thin film evaporation or the like. The distillate containing the organic solvent can be returned through line 10 and valve 8 to the return line 7. The aqueous phase in the separating unit 21 is returned through line 23 and valve 6 to the sludge tank 5.

Alternately, and as is more usually the case, the aqueous phase from the holding tank 11 can be passed directly to the sludge tank through valve 12 and lines 14 and 23 thereby by-passing the separating unit 21.

The circulation and pumping action of the process shown in FIG. 1 keeps the dispersion stable throughout the process, except when the dispersion is passed to the holding tank 11 where the dispersion can be isolated from the circulating system through the operation of valves 4, 6, 8, 9, 12, 16 and 18. In this area which is relatively free of agitation, the dispersion will phase separate as described above. Alternately, the holding tank can be eliminated and the sludge tank 5 can function as a quiescent area for phase separation to occur. The sludge tank could be isolated from the circulation system as generally described above for the holding tank when no painting is being done and the aqueous and organic phases separated and treated as described above. Also, it has been found that the organic solvents used in the practice in the invention besides being effective to separate the paint from the water are also excellent paint detackifiers and prevent the paint from forming a tacky sludge in the spray booth.

Illustrating the invention are the following examples which, however, are not to be considered as limiting the invention to their details. All parts and percentages in the examples as well as throughout the specification are by weight unless otherwise indicated.

EXAMPLES

Example 1

To approximate spraying paint into a spray booth, a household blender and a 50 ml. buret were used in an initial experiment. 200 ml. of water and 50 ml. of DBE 3 (mixed alkyl esters of alkylene dibasic acids from E. I. Du Pont de Nemours & Company) were placed in the pitcher of the blender. The buret was filled with a high solids enamel topcoat available from PPG Industries, Inc. as WDBC-9520. Paint was dripped from the buret at a rate of approximately 1 ml./min. while the water/solvent system was mixed by quickly turning the mixer on and off in a periodic fashion to minimize the amount of shear and splashing in the system. First 10 ml. and then 50 ml. of paint were added to the system. The paint appeared to be completely dispersed with no tacky sludge found anywhere in the pitcher. The system separated into two phases after approximately 15 minutes of quiescence. The top layer was aqueous and had no noticeable paint. The bottom layer appeared as a homogeneous dispersion of paint within organic solvent. Gas chromatography indicated the system's organic layer captured the organic solvents as well as the resins and pigments associated with the paint.

Example 2

Using a bench top spray booth (volume=30 liters), paint (WDBC-9520) was sprayed into a 20 percent by weight dispersion of DBE 3 in water. The dispersion was pumped from a lower reservoir to a header. The header sprays the dispersion into a trough where the dispersion overflows to create a water wall where the paint spray comes in contact with the dispersion. The liquid returns to the lower reservoir under gravity. The circulation action is sufficient to maintain the dispersion of the DBE 3 in the water.

Once the system began circulating, the DBE 3 appeared to be completely dispersed giving the mixture a milky color. Paint was completely dispersed giving the mixture a milky color. Paint was sprayed into the system to load the organic layer to approximately 3 percent by weight paint (combined pigment, resin and solvent); the percentage by weight being based on total weight of the dispersion. The paint seemed to be completely dissolved in the organic layer. The organic layer was dispersed and no evidence of tacky paint sludge was found. Once circulation was stopped, the mixture separated into two phases after standing approximately 15 minutes.

Another phenomenon found during the trial was the cleaning of the booth by the dispersion. Paint that had collected on the walls of the booth from sprayouts unrelated to this trial was removed by the circulating dispersion.

Example 3

Using the bench top spray booth of Example 2, the following paints obtained from PPG Industries, Inc. were added to the circulating dispersion:

| | | |
|---|---|---|
| Color specific primer | GPX 9979 | 1015.5 g |
| Color specific primer | GPX 9980 | 539.9 g |
| Color specific primer | GPX 8555 | 540.1 g |
| Color specific primer | GPX 5045 | 609.2 g |
| Antichip primer | GPX 5005 | 280.7 g |
| Primer | GPX 5045 | 2569.3 g |

The system was loaded with paint until the organic layer contained approximately 38 percent by weight paint. At this loading, the dispersion remained stable during circulation but still separated easily into two phases after standing. The organic layer appeared to be homogeneous with no tacky paint sludge found in the system. Although the paint addition increased the viscosity of the dispersion, it was still pumpable and readily dispersed the paint.

Example 4

Blender testing (as described in Example 1) was done with ethylene glycol monophenyl ether as the solvent instead of DBE 3. Using the same procedure as in Example 1, 10 ml. of WDBC-9520 was added to 50 ml. of ethylene glycol monophenyl ether dispersed in 200 ml. of water. The mixture separated easily into two phases with the paint appearing to be exclusively in the organic solvent phase. No tacky sludge was noted.

Example 5

Using the same procedure as in Example 4, 10 ml. of WDBC-9520 was added to 50 ml. of propylene glycol monophenyl ether dispersed in 200 ml. of water. The mixture separated easily into two phases with the paint appearing to be exclusively in the organic solvent phase. No tacky sludge was noted.

Example 6

Using the same procedure as in Example 4, 10 ml. of WDBC-9520 was added to 50 ml. of furfural dispersed in 200 ml. of water. The mixture separated easily into two phases with the paint appearing to be exclusively in the organic solvent phase. The aqueous layer was colored brown probably due to the slight water solubility of furfural in water. No tacky sludge was noted.

Example 7

Using the same procedure as in Example 4, 10 ml. of WDBC-9520 was added to 50 ml. of isophorone dispersed in 200 ml. of water. The mixture separated easily into two phases with the paint appearing to be exclusively in the organic solvent phase. No tacky sludge was noted.

Example 8

Using the same procedure as in Example 4, 10 ml. of WDBC-9520 was added to 50 ml. of DBE-IB (diisobutyl ester of alkylene dibasic acids from E. I. Du Pont de Nemours & Company) dispersed in 200 ml. of water. The mixture separated easily into two phases with the paint appearing to be exclusively in the organic solvent phase. No tacky sludge was noted.

Example 9

To a 500 gallon capacity spray booth containing 400 gallons of water was added 110 gallons of DBE 3. An average of 7 quarts of high solids basecoat enamel and 16 quarts of line flush solvent were sprayed into the system daily. The paints being sprayed were available from PPG Industries, Inc. as the NHU series, i.e., NHU-16898R "Bonzai Blue", NHU-47126R "Emerald Green", etc. The line flush solvents used were methyl ethyl ketone and xylene. No problems were experienced with starting the circulation system or with dispersing the organic phase. Separation of the two phases in a holding area was approximately 95 percent complete after 24 hours of quiescence. Maximum separation occured after approximately 100 hours. Separation of the two phases became slower as the paint content in the organic phases increased.

After 15 days of spraying, GC testing of the organic layer found the layer was comprised of approximately 10 percent by weight paint. GC testing of the water layer found no measurable paint solvents.

The organic layer was separated from the aqueous layer and passed to a bench top rotary vacuum evaporator for thin film evaporation. After distillation, the residue had 60.3 percent paint solids. The 67.0 percent of the DBE 3 was recovered in the distillate.

We claim:

1. A method for the removal and recovery of paint overspray which contains pigments, organic resins and organic solvents in paint spray booths comprising:
   (1) contacting said paint overspray which contains paint solids and organic solvent portion with an agitated dispersion of an organic solvent component in water so as to collect the paint overspray in the agitated dispersion; said organic solvent component being characterized as having a solubility in water of less than 15 percent by weight and in which water is soluble in the organic solvent component to an extent of less than 15 percent by weight, the percentages by weight being based on weight of organic solvent component and water, said organic solvent component having a specific gravity less than 0.98 or greater than 1.02; said dispersion being stable in the presence of agitation but unstable in the absence of agitation;
   (2) passing the dispersion containing the paint overspray to an area relatively free of agitation so as to cause the dispersion to spontaneously phase separate into an organic phase containing paint overspray and an aqueous phases;
   (3) separating the organic phase from the aqueous phase;
   (4) treating the organic phase to separate the paint solids from the organic solvent portion;
   (5) dispersing said organic solvent portion with said agitated dispersion for subsequent contact with said paint overspray;
   (6) recovering the portion which contains the paint solids.

2. The method of claim 1 in which the organic solvent component has a solubility in water of 1 to 5 percent by weight.

3. The method of claim 1 in which water has a solubility in the organic solvent component to extent of 1 to 5 percent by weight.

4. The method of claim 1 in which the organic solvent component has a vapor pressure less than 0.1 mm mercury.

5. The method of claim 1 in which the organic solvent component has a specific gravity of 0.90 to 0.95 or 1.05 to 1.10.

6. The method of claim 1 in which the agitated dispersion of the organic solvent component in water is provided by the pumping and circulating action of the dispersion in a water wash spray booth.

7. The method of claim 1 in which the organic solvent component is present in the dispersion in amounts of 2 to 50 percent by weight based on weight of water and organic solvent component.

8. The method of claim 7 in which the organic solvent component is present in the dispersion in amounts of 15 to 25 percent by weight based on weight of water and organic solvent component.

9. The method of claim 1 in which the organic solvent component contains a dialkyl ester of a dibasic acid having the following structure:

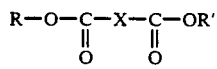

where R and R' are the same or different and are alkyl groups containing from 1 to 6 carbon atoms, and X is an alkylene group containing from 2 to 12 carbon atoms or a mixture of such esters.

10. The method of claim 9 in which the dialkyl ester of a dibasic acid is selected from the group consisting of dimethyl adipate, dimethyl glutarate, dimethyl succinate and mixtures thereof.

11. The method of claim 1 in which the organic solvent component contains a glycol ether or mixture of glycol ethers.

12. The method of claim 1 in which the organic phase in step 4 is distilled to recover the organic solvent portion in the distillate.

13. The method of claim 1 in which the organic phase in step 4 is centrifuged to recover the organic solvent portion in the centrifugate.

14. The method of claim 1 in which the organic phase in step 4 is subjected to thin film evaporation to recover the organic solvent portion in the distillate.

15. The method of claim 1 in which the aqueous phase separated in step 3 is reused for dispersing said organic solvent component for subsequent contact with said paint overspray.

* * * * *